(12) United States Patent
Cho et al.

(10) Patent No.: US 8,340,413 B2
(45) Date of Patent: Dec. 25, 2012

(54) DISPLAY DEVICE AND METHOD OF IMPROVING FLICKER OF IMAGE

(75) Inventors: Yang-ho Cho, Hwaseong-si (KR); Seung-sin Lee, Yongin-si (KR); Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1539 days.

(21) Appl. No.: 11/829,303

(22) Filed: Jul. 27, 2007

(65) Prior Publication Data

US 2008/0100743 A1 May 1, 2008

(30) Foreign Application Priority Data

Oct. 25, 2006 (KR) .................. 10-2006-0104182

(51) Int. Cl.
*G06K 9/00* (2006.01)
*G03F 3/08* (2006.01)
*H04N 5/14* (2006.01)
*H04N 9/64* (2006.01)

(52) U.S. Cl. ........ 382/167; 382/168; 382/172; 358/518; 348/575; 348/576

(58) Field of Classification Search .................. None
See application file for complete search history.

(56) References Cited

U.S. PATENT DOCUMENTS

| | | | | |
|---|---|---|---|---|
| 5,267,334 | A * | 11/1993 | Normille et al. | 382/236 |
| 7,068,841 | B2 * | 6/2006 | Luo | 382/167 |
| 7,736,069 | B2 * | 6/2010 | Nobori | 385/89 |
| 8,009,739 | B2 * | 8/2011 | Holcomb et al. | 375/240.25 |
| 2004/0032982 | A1 * | 2/2004 | Nishizawa | 382/171 |
| 2005/0001935 | A1 * | 1/2005 | Kiuchi et al. | 348/607 |
| 2006/0171587 | A1 * | 8/2006 | Kanatsu | 382/173 |
| 2007/0025683 | A1 * | 2/2007 | Nobori | 385/147 |

FOREIGN PATENT DOCUMENTS

| | | |
|---|---|---|
| JP | 2001-229375 | 8/2001 |
| JP | 2003-304417 | 10/2003 |
| JP | 2003-309763 | 10/2003 |
| JP | 2005-318198 | 11/2005 |
| JP | 2006-270417 | 10/2006 |
| KR | 2001-14920 | 2/2001 |
| KR | 2003-94469 | 12/2003 |
| KR | 2004-8067 | 1/2004 |

OTHER PUBLICATIONS

Kamikura et al. "Global Brightness-Variation Compansation for Video Codding", Dec. 1998, IEEE Transaction on Circuits and system for Video Technology, vol. 8, p. 988-1000.*

(Continued)

*Primary Examiner* — Randolph I Chu (74) *Attorney, Agent, or Firm* — Staas & Halsey LLP (57) ABSTRACT

A display device includes a scene conversion detecting module to detect whether a scene is converted in an input image, and a brightness compensating module to determine an image category of the input image when a scene conversion is generated in the input image, and compensating for the brightness of the input image by calculating a weighted mean value of a tone increase value corresponding to the determined image category and a tone increase value corresponding to an image category of a previous image.

27 Claims, 9 Drawing Sheets

OTHER PUBLICATIONS

Office Action issued in corresponding Korean Patent Application No. 2006-104182 dated Oct. 19, 2007.
Office Action, mailed Mar. 9, 2010, in corresponding Chinese Application No. 200710167427.0 (7 pp.).

Choe et al. "High Quality Image Processing for Mobile Displays," Samsung Journal of Innovative Technology. vol. 2, No. 1, Feb. 2006 pp. 119-130.

* cited by examiner

A TYPE

B TYPE

C TYPE

D TYPE

E TYPE

F TYPE

DISPLAY DEVICE AND METHOD OF IMPROVING FLICKER OF IMAGE

CROSS-REFERENCE TO RELATED APPLICATION

This application claims the benefit of Korean Application No. 2006-104182, filed Oct. 25, 2006 in the Korean Intellectual Property Office, the disclosure of which is incorporated herein by reference.

BACKGROUND OF THE INVENTION

1. Field of the Invention

Aspects of the present invention relate to preventing or reducing a flicker of a video or an image, and more particularly, to a display device and a method of improving a flicker of a video or an image while compensating for a reduced brightness thereof, when the display device, such as a digital camera, a camera phone, a camcorder, and/or others, is driven with low power.

2. Description of the Related Art

A personal portable terminal or a device, such as a cellular phone, a personal digital assistant (PDA) and/or other devices, has desirable characteristics such as 'portability' and 'mobility', to provide conveniences to users. However, because of these characteristics, the personal portable terminal needs to minimize power consumption.

For example, among components that form the personal portable terminal, a component which provides a light source to display images, such as a backlight unit or a similar device, consumes most of the power. Additionally, a decrease in luminance due to the reduction in power consumed by the backlight unit is compensated by performing a digital converting process on image information. Accordingly, the digital converting process enables decreasing or minimizing power consumption in the personal portable terminal while maintaining luminance of an image visually seen by users.

Various methods have been suggested for performing the digital converting process to convert input image information into digital information. One of these methods includes changing a compensated degree of luminance based on image characteristics.

However, problems that would not occur when various digital converting process methods are applied to still images occur when applied to videos. That is, before a scene or a frame is converted, the video generally maintain relatively similar brightness among adjacent scenes or frames. In some cases, however, adjacent frames have different image characteristics, and the compensated degree of luminance may be different among the adjacent frames to cause a flicker of the videos or images.

Further, a compensated degree of luminance is different when a scene is converted or when a scene conversion is generated or occurs. Also, brightness of the scenes or frames is not gradually varied, but may be quickly varied. As a result, a flicker of videos or images occurs.

If the flicker occurs when the video is being reproduced, visibility of the videos or images is lowered, to thereby reduce the quality of the video or the images seen by users.

SUMMARY OF THE INVENTION

Accordingly, an aspect of the present invention provides a display device and a method of improving a flicker of images, and which are capable of performing brightness compensation for a flicker of images do not occur when reproducing a video, while reducing a luminance of a backlight unit that provides a light source to display the images.

According to an aspect of the present invention, a display device includes a scene conversion detecting module to detect whether a scene is converted in an input image, and a brightness compensating module to determine an image category of the input image when the scene is converted in the input image, and to compensate for brightness of the input image by calculating a weighted mean value of a tone increase value corresponding to the determined image category and a tone increase value corresponding to an image category of a previous input image.

According to another aspect of the present invention, a method of improving a flicker of images include detecting whether a scene is converted in an input image, determining an image category of the input image when the scene is converted in the input image, and compensating for the brightness of the input image by calculating a weighted mean value of a tone increase value corresponding to the determined image category and a tone increase value corresponding to an image category for a previous input image.

According to another aspect of the present invention, a display device to reduce flicker in brightness compensated frames of a video includes a controller to extract characteristics of a current frame of the video, determine whether the current frame is converted compared to a previous frame of the video, and apply a weighted mean of a tone mapping function of the previous frame and the current frame if the current frame is determined to be converted so that a brightness of the frames of the video is varied gradually; and a storage device to store the characteristics and the tone mapping function of the current and the previous frames.

According to another aspect of the present invention, a method of reducing flicker in brightness compensated frames of a video includes extracting characteristics of a frame of the video; determining whether the frame is converted compared to a previous frame of the video; and applying a weighted mean of a tone mapping function of the previous frame and a current frame if the current frame is determined to be converted so that a brightness of the frames of the video is varied gradually.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Reference will now be made in detail to the aspects of the present invention, examples of which are illustrated in the accompanying drawings, wherein like reference numerals refer to the like elements throughout. The aspects are described below in order to explain the present invention by referring to the figures.

Aspects of the present invention will be described hereinafter with reference to block diagrams or flowchart illustrations of a display device and a method of improving a flicker of images according to aspects thereof. It will be understood that each block of the flowchart illustrations, and combinations of blocks in the flowchart illustrations can be implemented by computer program instructions. These computer program instructions can be provided to a processor of a general purpose computer, special purpose computer, and/or other programmable data processing apparatus to produce a machine, such that the instructions, which execute via the processor of the computer and/or other programmable data processing apparatus, create means to implement the functions specified in the flowchart block or blocks.

These computer program instructions may also be stored in a computer usable and/or computer-readable memory that can direct a computer and/or other programmable data processing apparatus to function in a particular manner, such that the instructions stored in the computer usable and/or computer-readable memory produce an article of manufacture including instruction means that implement the function specified in the flowchart block or blocks. The computer program instructions may also be loaded onto a computer and/or other programmable data processing apparatus to cause a series of operational steps to be performed on the computer and/or other programmable apparatus to produce a computer implemented process such that the instructions that are executed on the computer and/or other programmable apparatus provide steps to implement the functions specified in the flowchart block or blocks.

Also, each block of the block diagrams may represent a module, segment, or portion of code, which comprises one or more executable instructions to implement the specified logical function(s). It should also be noted that in some alternative implementations, the functions noted in the blocks may occur out of order. For example, two blocks shown in succession may in fact be substantially executed concurrently or the blocks may sometimes be executed in reverse order depending upon the functionality involved.

Figure 1:
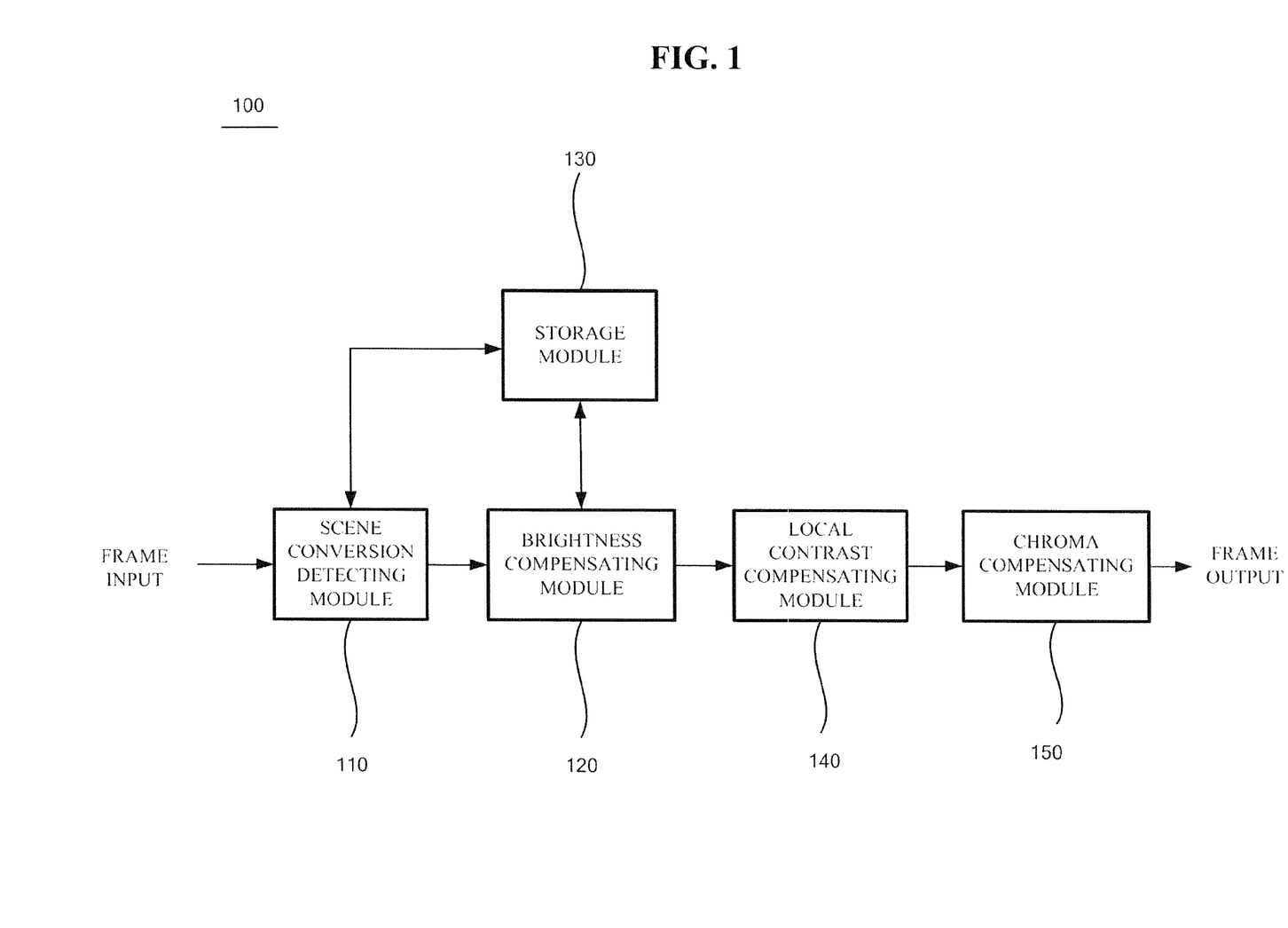
FIG. 1 is a block diagram illustrating a structure of a display device according to an aspect of the invention.

FIG. 1 is a block diagram illustrating a structure of a display device according to an aspect of the invention. Referring to FIG. 1, a display device 100 includes a scene conversion detecting module 110, a brightness compensating module 120, a storage module 130, a local contrast compensating module 140, and a chroma compensating module 150.

In the non-limiting aspect shown, the scene conversion detecting module 110 receives input frames that form a moving picture or video, compares a current input frame and a previous input frame, and detects whether a scene conversion is generated (has occurred) in the current input frame. In various aspects, the scene conversion may also be referred to as a scene being converted, or a scene conversion being made or occurring. In various aspects, the scene conversion or the converted scene may occur between input frames of the video. In an aspect of the invention, a scene is said to have converted if characteristics of the input frame or the image in terms of predetermined parameters has changed, and the change exceeds a predetermined value.

The brightness compensating module 120 determines an image category of the current input frame according to whether the scene conversion is made in the current input frame, applies a tone mapping function (TMF) corresponding to the determined image category to the current input frame, and improves the brightness of the current input frame.

The storage module 130 stores a lookup table (LUT) that has the TMF information corresponding to one or more the image categories, characteristics of images of the previous input frames, and the TMF information applied to the previous input frames.

The local contrast compensating module 140 improves a local contrast with respect to images or frames compensated by the brightness compensating module 120.

The chroma compensating module 150 improves chroma of the compensated images or frames.

Figure 2:
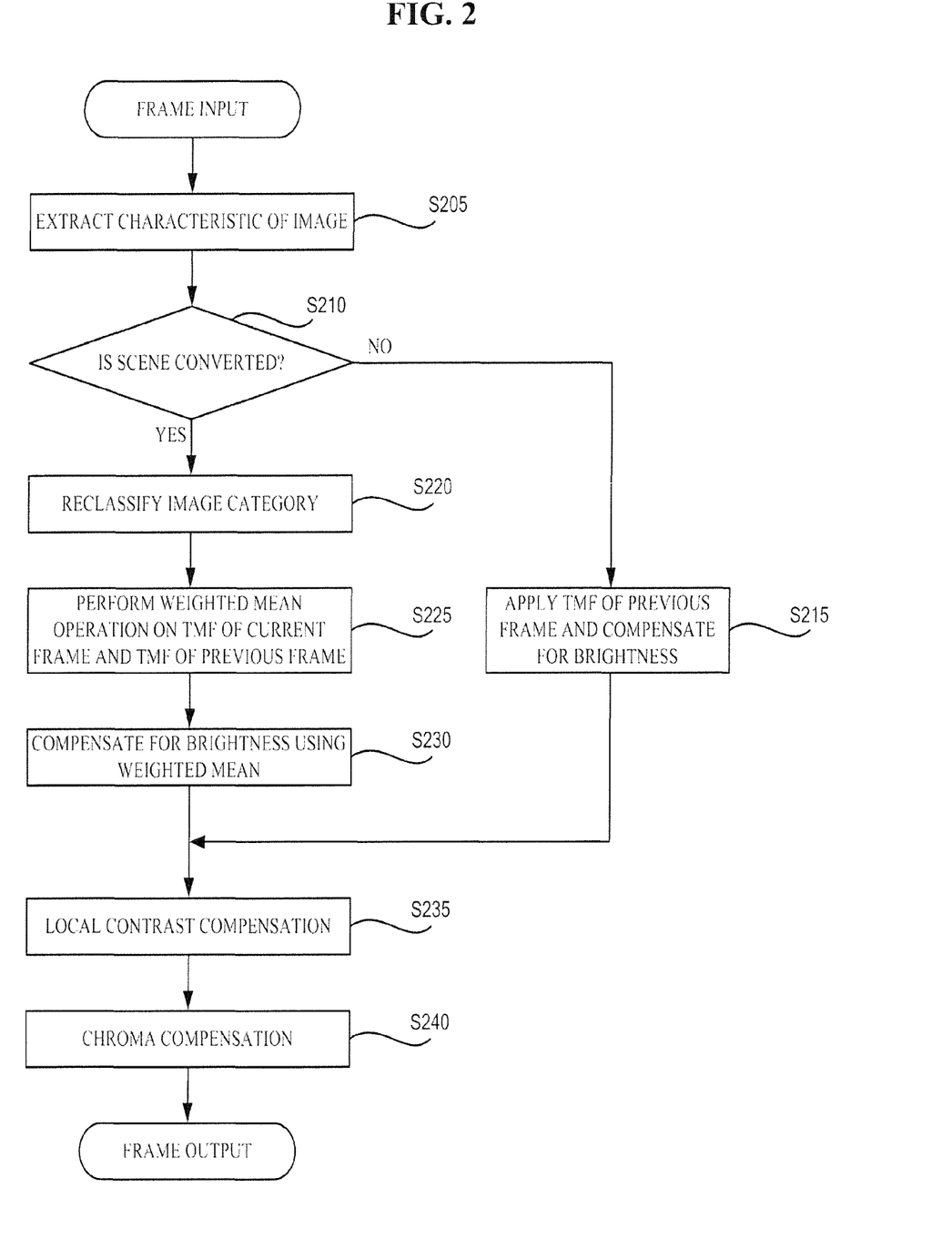
FIG. 2 is a flowchart illustrating a method of improving a flicker of images according to an aspect of the invention.

The operation of the respective modules that form the display device 100 shown in FIG. 1 will be described in detail with reference to the flowchart shown in FIG. 2, and with reference to FIGS. 3-9.

First, when the moving picture or the video is reproduced, respective frames thereof that form the reproduced moving picture or video are sequentially input to the scene conversion detecting module 110. In various aspects, the respective frames of the video contain one or more images.

Then, the scene conversion detecting module 110 creates or generates a luminance histogram of the respective input frames, and extracts characteristics of the images or the input frames from the created luminance histogram (operation S205). In various aspects, the luminance histogram may correspond to one or more input frames and/or one or more images.

The luminance histogram is information that indicates a luminance distribution of the input images or the input frames. In order to create the luminance histogram, a luminance value of each of the pixels in the input images or the input frames needs to be calculated. As an example of calculating the luminance value, the scene conversion detecting module 110 can use a calculation formula based on a standard suggested by NTSC (National Television System Committee), as represented by Equation 1.

$$Y = 0.288R + 0.587G + 0.114B \quad \text{[Equation 1]}$$

The R, G, and B of Equation 1 indicate a red component, a green component, and a blue component that are included in the corresponding pixel, respectively, and Y indicates a luminance value of the corresponding pixel. Equation 1 may be used where colors representing the input images are based on an RGB color space. If the colors representing the input images are based on a different type of a color space, a different method may be used in order to calculate the luminance value. However, aspects of the present invention are not limited by the type of luminance value calculating method. Accordingly, it is possible to use other luminance value calculating methods other than the method based on the calculation formula of the NTSC standard.

Figure 3:
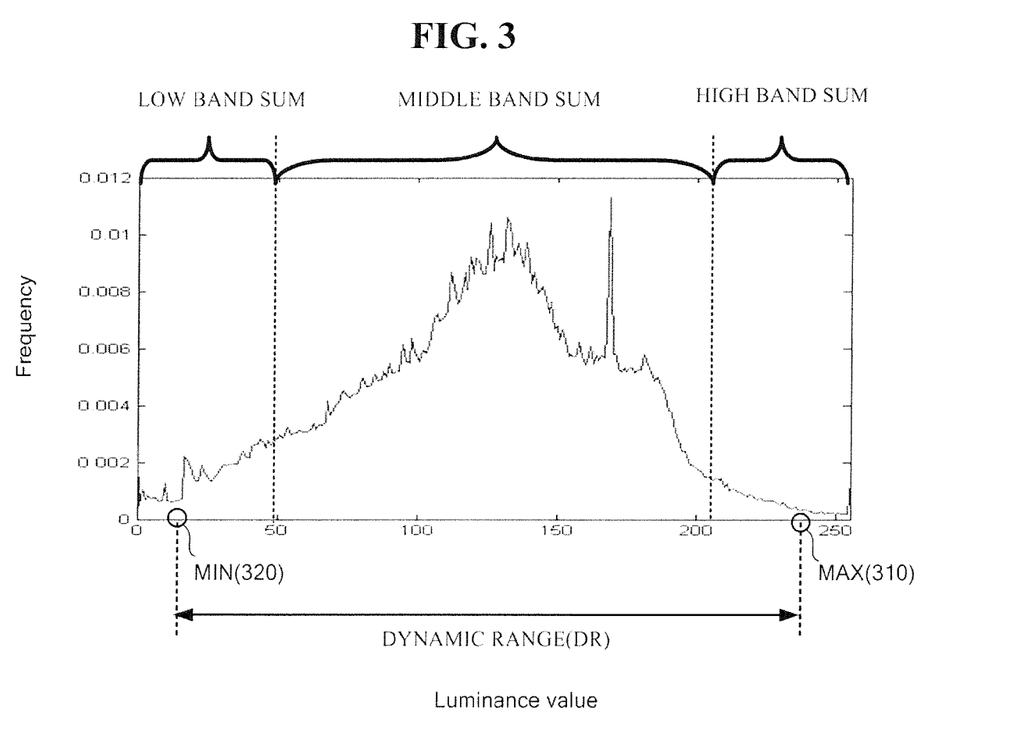
FIG. 3 is a diagram illustrating a histogram of brightness of images according to an aspect of the invention.

FIG. 3 shows a luminance histogram that is created by the above-described method according to an aspect of the present invention. The scene conversion detecting module 110 extracts the characteristics of the input images or the input frames from the luminance histogram. Referring to FIG. 3, the horizontal axis of the luminance histogram indicates a luminance value. For example, if an input image is an 8 bit image, the luminance value may range of 0 to 255. The vertical axis of the luminance histogram indicates a frequency of each luminance value. In the aspect shown, the frequency corresponds to the number of pixels that have the respective pixel values in the input image or the input frame. For example, if the input image has a size of 100×100 pixels and the number of pixels having a luminance value of 128 is 100, the vertical axis has a value of 0.01 in the histogram shown in FIG. 3. That is, the value of 0.01 represents a value of 100/(100×100), for example.

In FIG. 3, the horizontal axis of the luminance histogram is divided into a low band, a middle band, and a high band. Through a preliminary experiment, or by setting a value, the boundaries among the respective bands may be set or determined to values that can best classify the characteristics of the luminance histogram. For example, the boundary between the low band and the middle band corresponds to the lower 25% of the ranking range of the luminance values (in the case of a 8-bit image, a luminance value of 63), and the boundary between the middle band and the high band corresponds to the higher 25% of the range of the luminance value (in the case of a 8-bit image, a luminance value of 191).

Examples of parameters indicating the characteristics of the luminance histogram may include HS, LS, MS, Mean, and DR.

The HS indicates the number of pixels included in the high band, the LS indicates the number of pixels included in the low band, and the MS indicates the number of pixels included in the middle band.

Additionally, the Mean indicates a mean value of the luminance values for the entire image (or frame), and the DR indicates a dynamic range. The DR is defined by a maximum value MAX and a minimum value MIN. To elaborate, when frequencies of the respective luminance values are added up starting with the smallest luminance values, the MIN 320 indicates a luminance value representing the bottom 1% area (or values) of the luminance histogram. In addition, when frequencies of the respective luminance values are added up starting with the largest luminance values, the MAX 310 indicates a luminance value representing the top 1% area (or values) of the luminance histogram.

The scene conversion detecting module 110 determines whether the scene is converted by using the characteristics indicated by the above-described parameters. The following scene conversion detecting formula, as represented by Equation 2, may be used to detect whether the scene is converted.

$$SC = |(P_{mean} - C_{mean}) + (P_{DR} - C_{DR}) + (P_{LS} - C_{LS}) + (P_{MS} - C_{MS}) + (P_{HS} - C_{HS})| \quad \text{[Equation 2]}$$

In this aspect, SC indicates the scene conversion value, and P and C indicate a previous frame and a current frame, respectively. In addition, various characteristics of the image of the previous frame are stored in the storage module 130.

Once the SC value is determined using Equation 2, the scene conversion detecting module 110 compares the determined SC value and a scene conversion threshold value, and determines whether the scene is converted (or has been converted) in the current input frame (operation S210). For example, if the SC value is larger than the scene conversion threshold value, the scene conversion detecting module 110 determines that the scene conversion is generated in the current input frame.

If the scene conversion detecting module 110 determines that the scene conversion is generated, the brightness compensating module 120 reclassifies an image category of the current input image by making use of the luminance histogram created by using (or obtained from) the current input image (operation S220). In the aspect shown, the scene conversion threshold value may be predetermined. In the various aspects, the scene conversion threshold value may be stored in the storage member 130, or as part of the lookup table (LUT).

Figure 4:
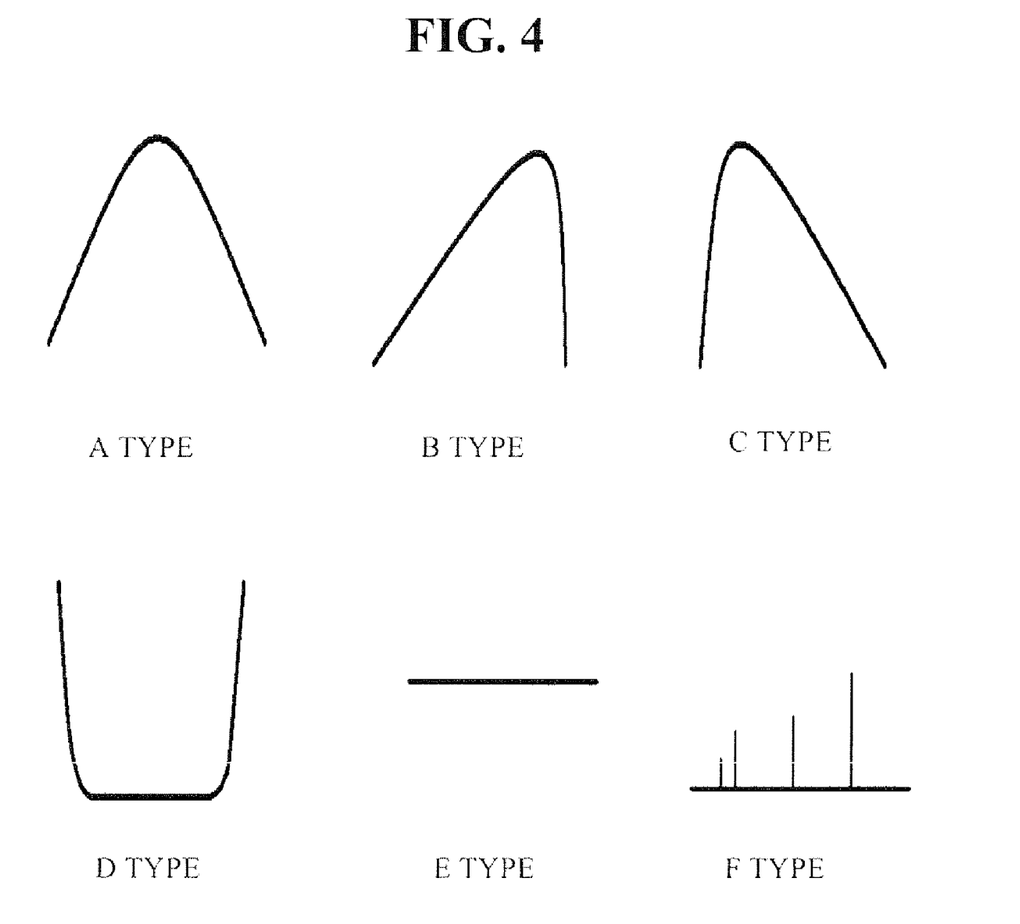
FIG. 4 is a diagram illustrating types of image categories according to an aspect of the invention.

FIG. 4 shows types of image categories according to an aspect of the present invention. An image category of an A type represents an image having a large amount of pixels belonging to the middle band, and a small amount of pixels belonging to the high band and the low band. An image category of a B type represents an image having a large amount of pixels belonging to the high band. An image category of a C type represents an image having a large amount of pixels belonging to the low band.

In the aspect shown, an image category of a D type is an image that indicates a high contrast, and represents an image having most of the pixels being distributed in the high band and the low band. An image category of an E type represents an image having pixels that are evenly distributed without being concentrated in a specific band. An image category of an F type represents an image having luminance values that are dispersedly (or distinctly) distributed, like in an image created by a graphic design process. The histogram of the respective image categories shown in FIG. 4 is only by way of example and non-limiting, and image categories having different characteristics may be used in various aspects.

Figure 5:
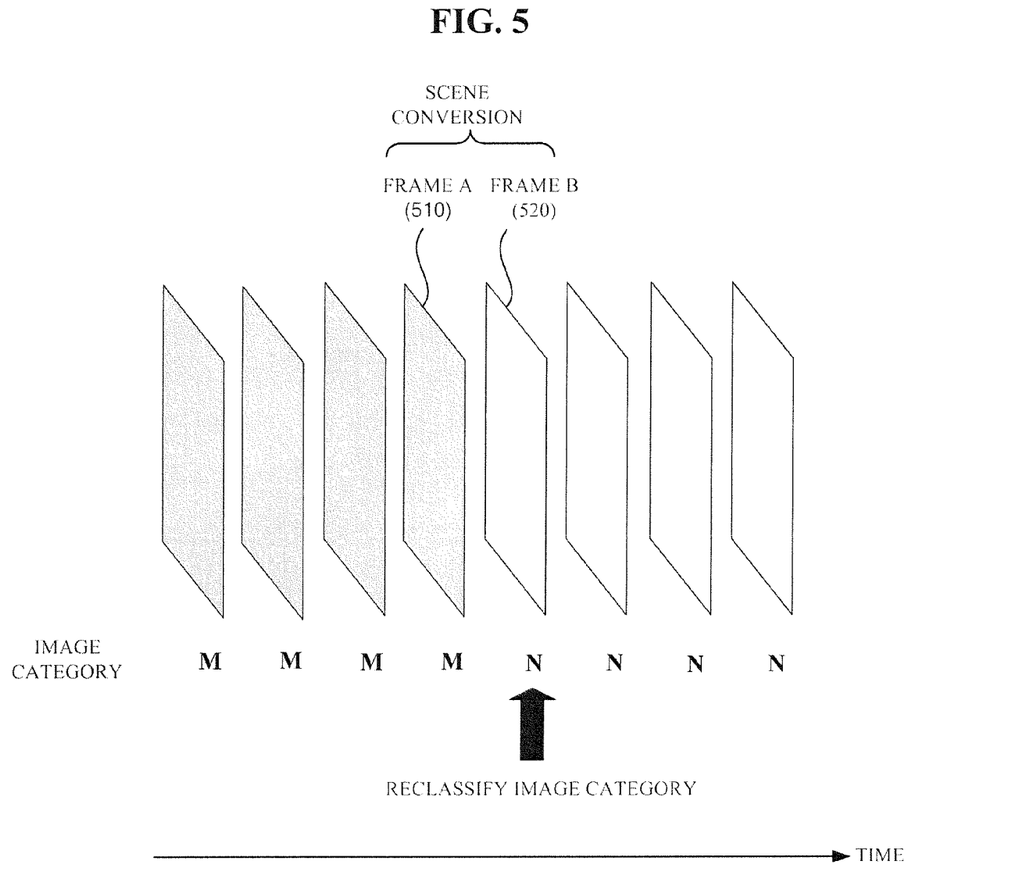
FIG. 5 is a diagram illustrating reclassification of image categories according to an aspect of the invention.

Reclassifying of the image categories according to an aspect of the present invention may be summarized, as shown in FIG. 5. That is, when a scene conversion is generated (or occurs) between a frame A 510 and a frame B 520, an image category of the frame B 520 is reclassified from an image category of an M type to an image category of an N type, for example. However, frames without the scene conversion have an image category of the same type. That is, when there is no scene conversion in the current input frame, it is assumed that an image category of the current input frame is the same as that of the previous frame.

In the aspect shown, after the brightness compensating module 120 reclassifies the image category of the current input frame, the brightness compensating module 120 performs an operation that calculates a weighted mean of a tone mapping function (TMF) of the current input frame and a tone mapping function (TMF) of the previous frame (operation S225). The TMF is a function that indicates an optimized pattern to adjust the luminance of an image that belongs to each image category in a low power mode, and may be stored in the storage module 130 in advance after the preliminary experiment or by choice.

Figure 6:
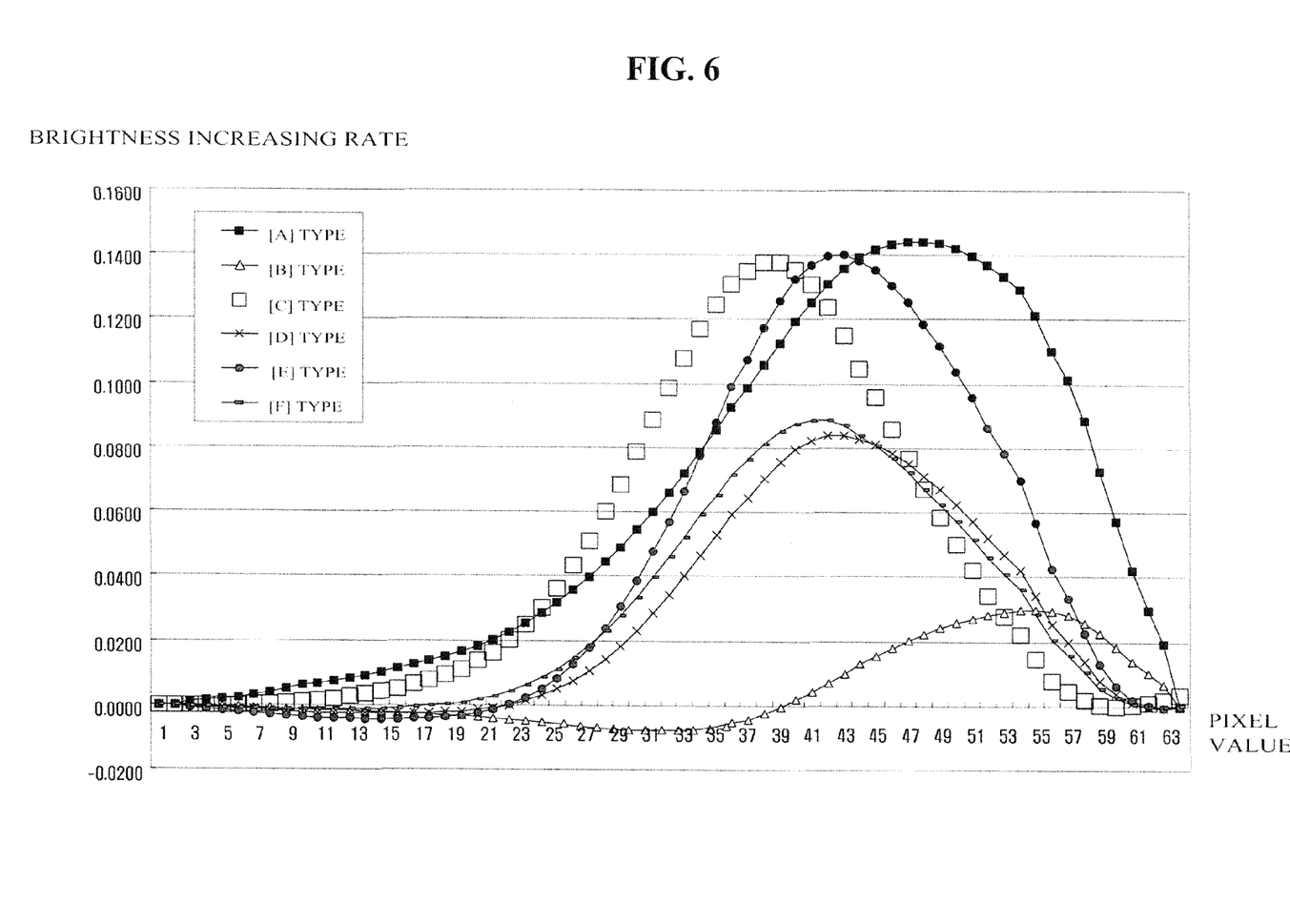
FIG. 6 is a graph illustrating a tone mapping function (TMF) corresponding to types of image categories according to an aspect of the invention.

FIG. 6 shows a graph that indicates the TMFs for the above-described six types of image categories. Referring to FIG. 6, the horizontal axis indicates the luminance values (or pixel values), and indicates a range of 0 to 63 based on a 6-bit image of this aspect. Further, in the graph of FIG. 6, the vertical axis indicates a luminance increasing rate (or a luminance increase value) corresponding to each of the luminance values. It is understood that a graph that indicates the TMFs for an 8-bit image would have a greater range of luminance values (i.e., from 0 to 255). In other aspects, other graphs that indicate TMFs for any number of bits are within the scope of the invention.

Accordingly, when a scene conversion is generated, the TMF corresponding to a relevant image category is not applied, but rather, a weighted mean of the TMF for the current frame and the TMF for the previous frame is applied, though not required. As such, the brightness of the image is gradually varied so that the scene conversion is generated without a flicker of the image when the scene converted. A lookup table (LUT), which has information of the TMF applied to the previous frame in order to calculate the weighted mean, is stored in the storage module 130.

Figure 7:
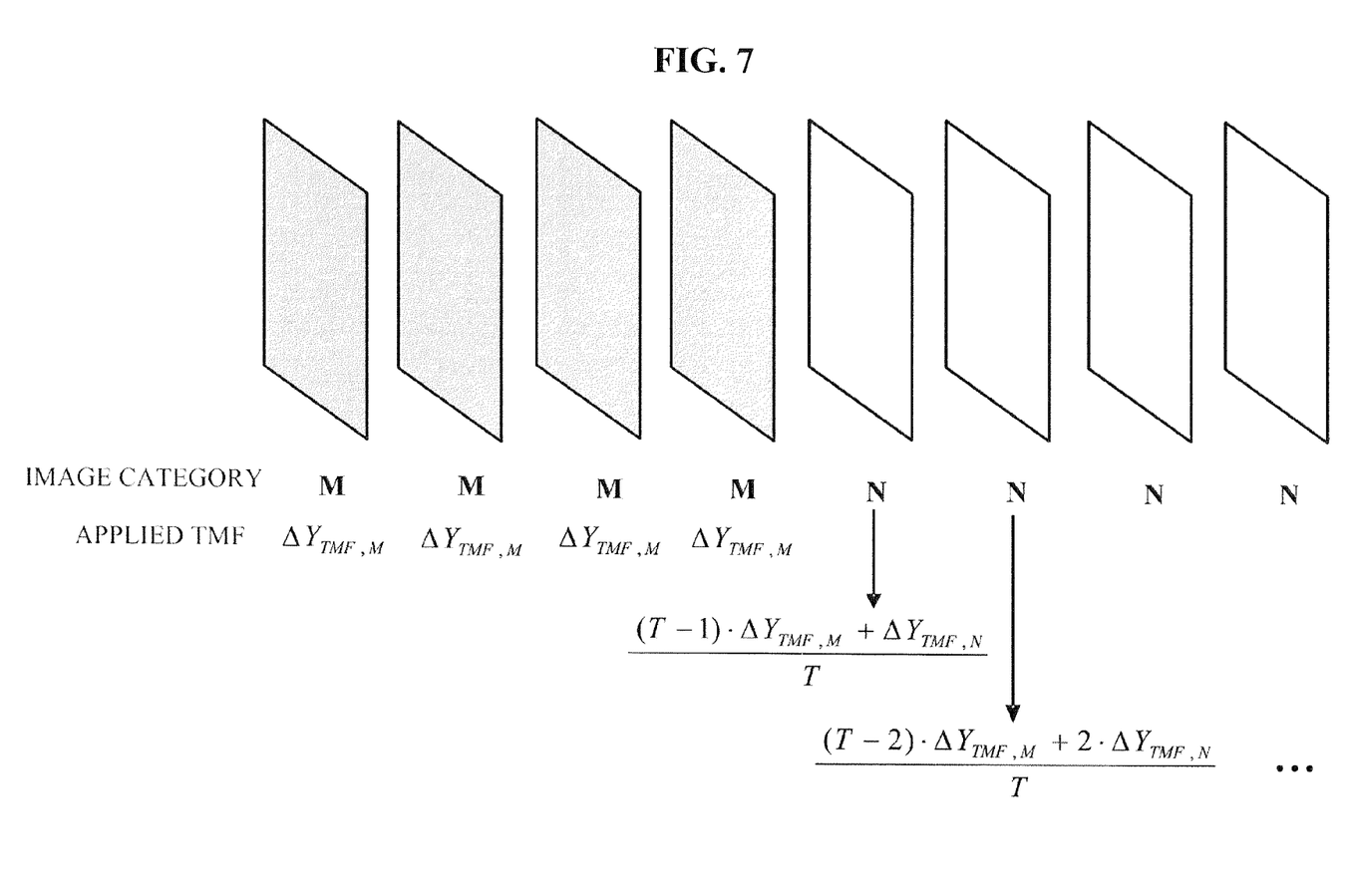
FIG. 7 is a diagram illustrating an application of a TMF by using a weighted mean operation at a time of converting a scene according to an aspect of the invention.

FIG. 7 shows schematic operation of applying the weighted mean of the TMF when the scene conversion is generated. Referring to FIG. 7, when an image category of the frame is converted into an image category of an N type from an image category of an M type, brightness of the images are gradually varied over T frames after the scene is converted, to thereby prevent or reduce a flicker of the images. That is, when the scene conversion is generated and a different image category is allocated to the subsequent input frames or images, an increase (or a change) in the brightness of the input frames or images by the TMF occurring after the scene is converted is compensated by performing a weighted mean operation on the TMFs of the prior and the subsequent frames relative to where the scene is converted. The weighted mean operation is represented by Equation 3.

$$\Delta Y_{TMF,out} = \frac{(T-i) \cdot \Delta Y_{TMF,M} + i \cdot \Delta Y_{TMF,N}}{T} \quad \text{[Equation 3]}$$

As shown, $\Delta Y_{TMF\_out}$ indicates a brightness increase value to be ultimately applied, $\Delta Y_{TMF,M}$ and $\Delta Y_{TMF,N}$ indicate a brightness increase value of the TMF of the M image category and a brightness increase value of the TMF of the N image category, respectively, and T indicates the number of frames to which the weighted mean TMF are applied after the scene is converted.

Figure 8:
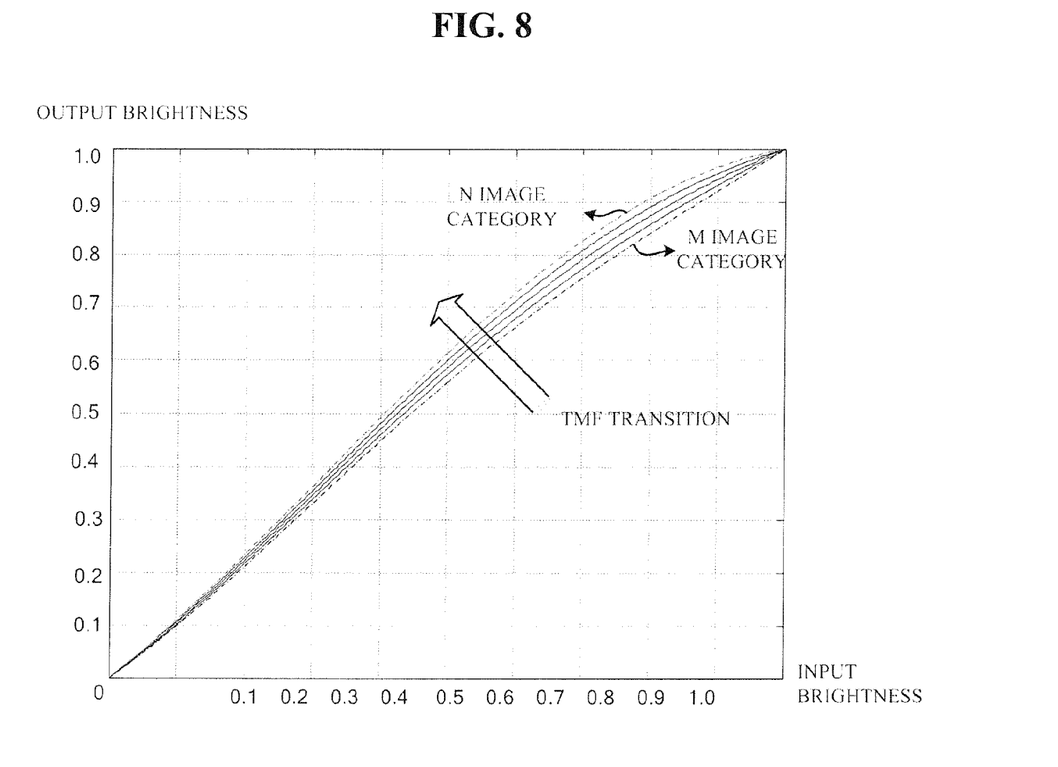
FIG. 8 is a graph illustrating a TMF conversion by using frame interpolation according to an aspect of the invention.

FIG. 8 shows a TMF conversion by use of frame interpolation. As shown in FIG. 8, the TMF is gradually varied toward the next image category from the previous image category such that a flicker is prevented or reduced from occurring in videos or images.

If the brightness increase value to be ultimately applied is calculated by Equation 3, the scene detecting module 110 compensates for the brightness of the image of a current frame based on the calculated brightness increase value (operation S230).

Meanwhile, in operation S210, when the scene conversion detecting module 110 determines that a scene is not converted, the brightness compensating module 120 applies the TMF corresponding to the image category of the previous frame to compensate for the image brightness of the current frame (operation S215).

In aspects of the present invention, the compensated image brightness may be represented by Equation 4. [Equation 4]

$$Y_{TMF\_out} = Y_{in} + (\Delta Y_{TMF} \times \text{Gain})$$

In the equation, $Y_{TMF\_out}$ indicates the compensated image brightness, $Y_{in}$ indicates an original brightness of an input image, $\Delta Y_{TMF}$ indicates a tone mapping function of the respective image category (that is, a tone increase value), and Gain indicates a TMF gain. In the aspect shown, the TMF gain may be a fixed value or a value that varies according to a pixel location of an image according to an image category. In this aspect of the present invention, it is preferable that when image categories are A, B, C, and E types having distribution characteristics similar to those of natural images (e.g., photographs), a variable TMF gain may be applied, and when image categories are D and F types having similar distribution characteristics similar to those of graphic design images (e.g., computer generated images), a fixed TMF gain be applied. In various aspects, information of the variable TMF gain and the fixed TMF gain of the respective image category may be stored in the storage module 130.

In the non-limiting aspect shown, if the brightness in the current input image is compensated according to the above-described method, a local contrast is compensated by the local contrast compensating module 140 so as to perform finer complementation (or compensation) for each region in an image (operation S235). In the aspect shown, various local contrast compensating methods may be applied.

Then, the chroma compensating module 150 classifies a decrease in the chroma generated by the TMF and a local contrast compensation for each region by a skin color and remaining region, and performs individual chroma compensation (operation S240). In aspects of present invention, chroma may refer to the purity or distinctiveness of color, for example.

Figure 9:
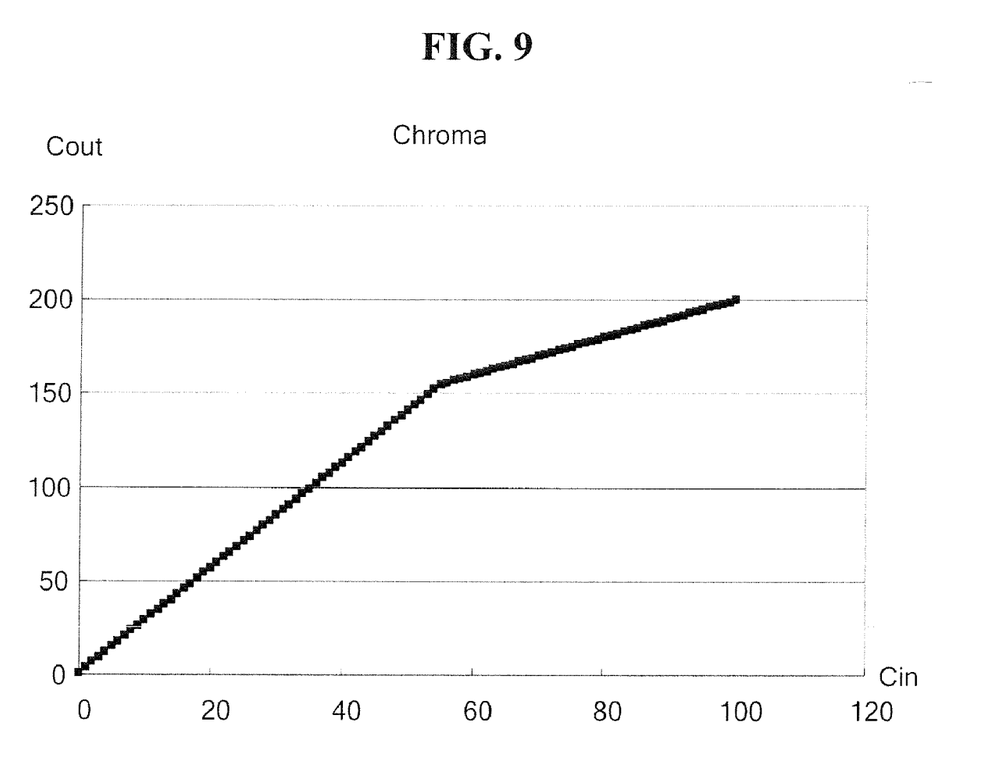
FIG. 9 is a diagram illustrating a graph for compensating for a chroma according to an aspect of the invention.

As an example of the above discussed chroma compensation, a graph shown in FIG. 9 may be used. Referring to FIG. 9, the horizontal axis indicates a chroma value of a pixel that is scaled between 0 and 100, and the vertical axis indicates a relative chroma reinforcing value for each pixel.

FIG. 9 shows a graph used to reinforce the chroma, and a reinforced degree thereof can be obtained by experiments or by setting a value such that visibility of images is ensured or improved. The graph used to improve the chroma is not limited to that shown in FIG. 9, but any graph, by which the chroma is improved to ensure visibility in images, may be used in various aspects of the invention.

Finally, the image frame that is compensated by the chroma compensating module 150 is output to a user through a display screen (not shown).

Meanwhile, the term "unit," "module," or "table" used in aspects of the present invention, may refers to software, or a hardware component such as an FPGA (Field Programmable Gate Array) or an ASIC (Application Specific Integrated Circuit) and the modules each perform assigned functions. However, the modules are not limited to software or hardware. The modules may be configured in an addressable storage medium, or may be configured to run on at least one processor. Therefore, as an example, the modules may include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the modules may be combined into fewer components and/or modules may be separated into additional components and modules. In addition, the components and the modules may be configured to execute at least one CPU in a device.

Various components of the display device 100, as shown in FIG. 1, such as the scene conversion detecting module 110, the brightness compensating module 120, the local contrast compensating module 140, and/or a chroma compensating module 150 can be integrated into a single controller, a control module, or a control unit, or alternatively, can be implemented in software or hardware, such as, for example, an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In addition, the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, although discussed in terms of images in one or more aspects, videos, frames, or frames of videos are also within the scope of the invention. Also, although discussed in terms of 6 and 8 bit images and/or frames, aspects of the present invention are applicable to an image, a frame, and/or a video having any bit values. Also, aspects of the present invention are applicable to a personal portable terminal or a device, such as a cellular phone, a personal digital assistant (PDA), a portable computer, a personal video/audio player, and/or other devices.

Alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Furthermore, the software modules as described can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims. According to a display device and a method of improving a flicker of images, a flicker of a moving picture screen can be prevented or reduced in compensating for a decrease in brightness that occurs when a display device is driven with low power.

What is claimed is:

1. A display device comprising:
a scene conversion detecting module to detect whether a scene is converted in an input image; and
a brightness compensating module to determine an image category of the input image when the scene is converted in the input image, and to compensate for a brightness of the input image by calculating a weighted mean value of a tone increase value corresponding to the determined image category and a tone increase value corresponding to an image category of a previous input image using at least one processor.

2. The display device of claim 1, wherein the scene conversion detecting module extracts characteristics of the input image from a luminance histogram of the input image, and detects whether the scene is converted based on the extracted characteristics.

3. The display device of claim 1, wherein the scene conversion detecting module compares an SC value determined by a scene conversion detecting formula using a luminance histogram of the input image and a predetermined scene conversion threshold value, and determines whether the scene is converted in the input image, and wherein the scene conversion detecting formula is $$SC = |(P_{mean} - C_{mean}) + (P_{DR} - C_{DR}) + (P_{LS} - C_{LS}) + (P_{MS} - C_{MS}) + (P_{HS} - C_{HS})|, \text{ where}$$

P and C indicate the previous input image and the input image, respectively, mean indicates a mean value of luminance values of an entire image, HS indicates the number of pixels that are included in a high band of an image, LS indicates the number of pixels that are included in a low band of an image, MS indicates the number of pixels that are included in a middle band of an image, and DR indicates a dynamic range of the luminance values of an image.

4. The display device of claim 1, wherein the weighted mean value is determined by the equation:

$$\Delta Y_{TMF,out} = \frac{(T - i) \cdot \Delta Y_{TMF,M} + i \cdot \Delta Y_{TMF,N}}{T}, \text{ where}$$

$\Delta Y_{TMF\_out}$ indicates a brightness increase value to be ultimately applied, $\Delta Y_{TMF,M}$ and $\Delta Y_{TMF,N}$ indicate the tone increase value corresponding to the image category of the previous input image and the tone increase value corresponding to the image category of the input image, respectively, T indicates the number of images to which the weighted mean operation is applied to after the scene is converted, and i indicates an index of numbers.

5. The display device of claim 1, wherein, if the scene is not converted, the brightness compensating module applies the tone increase value corresponding to the image category of the previous input image, and compensates for the brightness of the input image.

6. A method of improving a flicker of images, the method comprising:
   detecting whether a scene is converted in an input image; and
   determining an image category of the input image when the scene is converted in the input image, and
   compensating for a brightness of the input image by calculating a weighted mean value of a tone increase value corresponding to the determined image category and a tone increase value corresponding to an image category of a previous input image.

7. The method of claim 6, wherein the detecting of whether the scene is converted in the input image comprises:
   extracting characteristics of the input image from a luminance histogram of the input image; and
   detecting whether the scene is converted based on the extracted characteristics.

8. The method of claim 6, wherein:
   the detecting of whether the scene is converted in the input image comprises comparing an SC value determined by a scene conversion detecting formula using a luminance histogram of the input image and a predetermined scene conversion threshold value to determine whether the scene is converted in the input image, and wherein the scene conversion formula is $SC=|(P_{mean}-C_{mean})+(P_{DR}-C_{DR})+(P_{LS}-C_{LS})+(P_{MS}-C_{MS})+(P_{HS}-C_{HS})|$, where P and C indicate the previous input image and the input image, respectively, mean indicates a mean of luminance values of an entire image, HS indicates the number of pixels that are included in a high band of an image, LS indicates the number of pixels that are included in a low band of an image, MS indicates the number of pixels that are included in a middle band of an image, and DR indicates a dynamic range of the luminance values of an image.

9. The method of claim 6, wherein the weighted mean value is determined by the equation:

$$\Delta Y_{TMF,out} = \frac{(T-i)\cdot \Delta Y_{TMF,M} + i\cdot \Delta Y_{TMF,N}}{T}, \text{ where}$$

$\Delta Y_{TMF\_out}$ indicates a brightness increase value to be ultimately applied, $\Delta Y_{TMF,M}$ and $\Delta Y_{TMF,N}$ indicate the tone increase value corresponding to the image category of the previous input image and the tone increase value corresponding to the image category of the input image, respectively, T indicates the number of images to which a weighted mean operation is applied after the scene is converted, and i indicates an index of numbers.

10. The method of claim 6, further comprising, if the scene is not converted,
    applying the tone increase value corresponding to an image category of the previous input image so as to compensate for the brightness of the input image.

11. A display device to reduce flicker in brightness compensated frames of a video, comprising:

a controller to extract characteristics of a current frame of the video, determine whether the current frame is converted compared to a previous frame of the video, and apply a weighted mean of a tone mapping function of the previous frame and the current frame if the current frame is determined to be converted so that a brightness of the frames of the video is varied gradually; and
    a storage device to store the characteristics and the tone mapping function of the current and the previous frames.

12. The display device of claim 11, wherein the tone mapping function of the previous frame is applied to the current frame instead of the weighted mean if the current frame is determined not to be converted so that the brightness of the frames of the video is maintained.

13. The display device of claim 12, wherein if not converted, then the brightness of the frames of the video is maintained by obtaining a compensated frame brightness represented by $Y_{TMF\_out}=Y_{in}+(\Delta Y_{TMF}\times \text{Gain})$, where $Y_{TMF\_out}$ indicates the compensated frame brightness, $Y_{in}$ indicates an original brightness of the image, $\Delta Y_{TMF}$ indicates the tone mapping function of a corresponding image category, and Gain indicates a tone mapping function gain, and wherein the tone mapping function gain is a fixed value or a value that varies according to a pixel location of the frames according to the image category.

14. The display device of claim 11, wherein extracting of the characteristics includes generating a luminance histogram of the frames by calculating a luminance value of each pixel of the frames using the equation Y=0.288R+0.587G+0.114B, where R is red, G is green, and B is blue of the RGB color space.

15. The display device of claim 11, wherein the determining of whether the current frame is converted includes obtaining a scene conversion value (SC), and comparing whether the SC exceeds a threshold scene conversion value, and wherein the SC is $SC=|(P_{mean}-C_{mean})+(P_{DR}-C_{DR})+(P_{LS}-C_{LS})+(P_{MS}-C_{MS})+(P_{HS}-C_{HS})|$, where P and C indicate the previous frame and the current frame, respectively, and mean indicates a mean of luminance values of an entire frame, HS indicates the number of pixels that are included in a high band of a frame, LS indicates the number of pixels that are included in a low band of a frame, MS indicates the number of pixels that are included in a middle band of a frame, and DR indicates a dynamic range of the luminance values of a frame, using the luminance histograms of the frames of the video.

16. The display device of claim 11, wherein the weighted mean to vary the brightness of the frames is varied by $$\Delta Y_{TMF,out} = \frac{(T-i)\cdot \Delta Y_{TMF,M} + i\cdot \Delta Y_{TMF,N}}{T}, \text{ where}$$

$\Delta Y_{TMF,out}$ indicates a brightness change value to be ultimately applied, $\Delta Y_{TMF,M}$ indicate a brightness change value of an image category of the previous frame, $\Delta Y_{TMF,N}$ indicate a brightness change value an image category of the frames, and T indicates the number of frames to which the weighted mean are applied after the scene is converted.

17. The display device of claim 11, wherein the controller compensates for a local contrast to obtain finer brightness compensation for each region of the frames, and compensates for individual chrome.

18. The display device of claim 11, where the display device is a cellular phone, a personal digital assistant (PDA), a portable computer, and/or a personal video/audio player.

19. A method of reducing flicker in brightness compensated frames of a video, comprising:
   extracting characteristics of a current frame of the video;
   determining whether the current frame is converted compared to a previous frame of the video; and
   applying a weighted mean of a tone mapping function of the previous frame and the current frame if the frame is determined to be converted so that a brightness of the frames of the video is varied gradually.

20. The method of claim 19, wherein the tone mapping function of the previous frame is applied to the current frame instead of the weighted mean if the current frame is determined not be converted so that the brightness of the frames of the video is maintained.

21. The method of claim 20, wherein if not converted, then the brightness of the frames of the video is maintained by obtaining a compensated frame brightness represented by $$Y_{TMF\_out} = Y_{in} + (\Delta Y_{TMF} \times Gain), \text{ where}$$

$Y_{TMF\_out}$ indicates the compensated frame brightness, $Y_{in}$ indicates an original brightness of the image, $\Delta Y_{TMF}$ indicates the tone mapping function of a corresponding image category, and Gain indicates a tone mapping function gain, and wherein the tone mapping function gain is a fixed value or a value that varies according to a pixel location of the frames according to the image category.

22. The method of claim 19, wherein extracting of the characteristics includes generating a luminance histogram of the frames by calculating a luminance value of each pixel of the frames using the equation Y=0.288R+0.587G+0.114B, where R is red, G is green, and B is blue of the RGB color space.

23. The method of claim 19, wherein the determining of whether the current frame is converted includes obtaining a scene conversion value (SC), and comparing whether the SC exceeds a threshold scene conversion value, and wherein the SC is $$SC = |(P_{mean} - C_{mean}) + (P_{DR} - C_{DR}) + (P_{LS} - C_{LS}) + (P_{MS} - C_{MS}) + (P_{HS} - C_{HS})|, \text{ where}$$

P and C indicate the previous frame and the current frame, respectively, and mean indicates a mean of luminance values of an entire frame, HS indicates the number of pixels that are included in a high band of a frame, LS indicates the number of pixels that are included in a low band of a frame, MS indicates the number of pixels that are included in a middle band of a frame, and DR indicates a dynamic range of the luminance values of a frame, using the luminance histograms of the frames of the video.

24. The method of claim 19, wherein the weighted mean to vary the brightness of the frames is varied by $$\Delta Y_{TMF,out} = \frac{(T-i) \cdot \Delta Y_{TMF,M} + i \cdot \Delta Y_{TMF,N}}{T}, \text{ where}$$

$\Delta Y_{TMF,out}$ indicates a brightness change value to be ultimately applied, $\Delta Y_{TMF,M}$ indicate a brightness change value of an image category of the previous frame, $\Delta Y_{TMF,N}$ indicate a brightness change value an image category of the current frame, and T indicates the number of frames to which the weighted mean are applied after the scene is converted.

25. The method of claim 19, further comprising:
   compensating for a local contrast to obtain finer brightness compensation for each region of the frames; and
   compensating for individual chroma.

26. A non-transitory computer readable medium recorded with a program for at least one processor to execute the method of reducing flicker in brightness compensated frames of a video of claim 19.

27. A non-transitory computer readable medium recorded with a program for at least one processor to execute the method of reducing flicker in brightness compensated frames of a video of claim 6.

* * * * *

UNITED STATES PATENT AND TRADEMARK OFFICE
CERTIFICATE OF CORRECTION

| | | |
|---|---|---|
| PATENT NO. | : 8,340,413 B2 | Page 1 of 1 |
| APPLICATION NO. | : 11/829303 | |
| DATED | : December 25, 2012 | |
| INVENTOR(S) | : Yang-ho Cho et al. | |

It is certified that error appears in the above-identified patent and that said Letters Patent is hereby corrected as shown below:

Title Page, Column 2 (Other Publications); Line 1; Delete "Compansation" and insert -- Compensation --, therefor.

Title Page, Column 2 (Other Publications); Line 2; Delete "Codding" and insert -- Coding --, therefor.

In the Claims:

Column 10; Line 63; In Claim 4, delete "$\Delta Y_{TMF\_out}$" and insert -- $\Delta Y_{TMF,out}$ --, therefor.

Column 11; Line 53; In Claim 9, delete "$\Delta Y_{TMF\_out}$" and insert -- $\Delta Y_{TMF,out}$ --, therefor.

Column 13; Line 4; In Claim 17, delete "chrome." and insert -- chroma. --, therefor.

Signed and Sealed this
Twenty-first Day of May, 2013

Teresa Stanek Rea
*Acting Director of the United States Patent and Trademark Office*